US006696777B2

(12) United States Patent
Tamura

(10) Patent No.: US 6,696,777 B2

(45) Date of Patent: Feb. 24, 2004

(54) COOLING STRUCTURE OF A PROJECTION TUBE

(75) Inventor: Katsuyoshi Tamura, Mobara (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/920,142

(22) Filed: Aug. 1, 2001

(65) Prior Publication Data

US 2003/0015312 A1 Jan. 23, 2003

(30) Foreign Application Priority Data

Jul. 17, 2001 (JP) ....................................... 2001-216129

(51) Int. Cl.[7] .............................. F28F 7/00; H01K 1/58

(52) U.S. Cl. .......................... 313/36; 165/80.4; 313/35; 313/44; 313/477 R

(58) Field of Search ............................. 313/35, 36, 44, 313/477 R, 478, 482

(56) References Cited

U.S. PATENT DOCUMENTS 4,568,852 A * 2/1986 Kobayashi et al. ........... 313/36
4,731,557 A * 3/1988 Asano et al. ................. 313/36
5,471,111 A 11/1995 Kim
5,521,459 A 5/1996 Kim
6,093,998 A * 7/2000 Takezawa .................... 313/36

* cited by examiner

*Primary Examiner*—Vip Patel
*Assistant Examiner*—Sharlene Leurig
(74) *Attorney, Agent, or Firm*—Milbank, Tweed, Hadley & McCloy LLP

(57) ABSTRACT

A cooling structure of a projection tube having a following constitution is disclosed. A chamber in which a liquid coolant for cooling a panel surface is filled is formed on the panel surface of the projection tube and the chamber is defined by the panel surface, a lens which faces the panel surface in an opposed manner and a metal envelope which radiates heat. A first seal member is disposed between the metal envelope and the panel surface, while a second seal member is disposed between the metal envelope and the lens. A holder for pressing the lens in the direction toward the metal envelope is disposed in the periphery of the lens. Pads which have surfaces approximately perpendicular to a tube axis of the projection tube are formed on a funnel portion of the projection tube. A sustainer for supporting the chamber is brought into contact with the pads. The holder and the sustainer are fastened to each other by means of couplers so as to apply pressure to the first seal member and the second seal member whereby the chamber is sealed without coupling the coupler with the metal envelope.

6 Claims, 4 Drawing Sheets

16 10 41 11 12 15 151 1 13 14 2 5 8 4 9 7 3

COOLING STRUCTURE OF A PROJECTION TUBE

BACKGROUND OF THE INVENTION

1. Field of the Invention

The present invention relates to a cooling structure of a projection tube incorporated in a projection TV set, for example.

2. Description of the Related Art

Recently, projection TV sets having a large screen of not less than 40 inches have been popularly used. The projection TV set is served for projecting an image of a projection tube (PRT) having a screen size of approximately 5.5 inches on a screen of approximately 40 inches using an optical lens, a mirror and the like. In general, a color image is obtained by projecting images from three projection tubes which respectively produce monochroic images of red, green and blue on a screen. In the projection system, for example, to project the image of approximately 5.5 inches of the PRT on the screen of 40 inches, the image is magnified by not less than 50 times in area. Accordingly, the image of the PRT is required to have an extremely high brightness. To realize the high brightness, it is necessary to supply a large current to the small screen of approximately 5.5 inches and this elevates the temperature of a phosphor screen and a panel glass. The elevation of the temperature of the phosphor screen gives rise to a problem such as the lowering of light emitting efficiency of a phosphor body or the breaking of the panel glass due to the thermal distortion.

To solve this problem, it is necessary to cool the phosphor screen. U.S. Pat. No. 4,731,557 discloses one typical cooling structure. In this cooling structure, to seal a coolant in a chamber, seal members are provided at two locations and the chamber is sealed by a mechanical pressure exerted by these seal members. However, this cooling structure still has several drawbacks including following drawbacks. That is, when a defect exists in the seal member at one location, the liquid leaks from the chamber. Further, since it is necessary to mechanically fasten the seal members using bolts or the like to respectively seal at two locations, the manufacturing cost is pushed up.

SUMMARY OF THE INVENTION

Accordingly, it is an object of the present invention to provide a cooling structure of a projection tube which can solve such drawbacks and can minimize sealing defects, can reduce the operation cost and the manufacturing cost, and can reproduce parts.

According to the present invention, in a structure which cools a panel by bringing a liquid into direct contact with a panel surface of a PRT, a chamber which accommodates the liquid is supported on a funnel of the PRT. A mechanical pressure necessary for sealing the liquid in the chamber is obtained only by a coupling with a sustaining structure from a funnel.

With respect to other features of the present invention, in a structure having a chamber which has one side thereof formed of a panel surface of a PRT, the other side thereof which faces the one side in an opposed manner formed of a lens and a side surface thereof formed of a metal envelope which radiates heat, an adhesive is used as a seal between the lens and the metal envelope, and the metal envelope and the surface of the panel of the PRT are sealed to each other by applying a mechanical pressure to a seal member.

DESCRIPTION OF THE PREFERRED EMBODIMENTS

Subsequently, embodiments of the present invention are explained in reference to attached drawings hereinafter.

Figure 1:
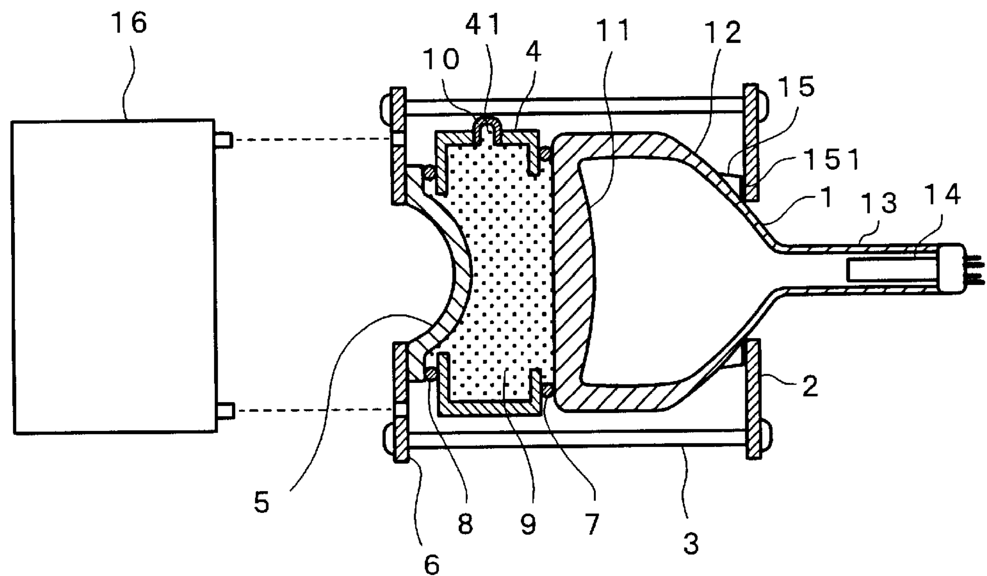
FIG. 1 is a cross-sectional view of a liquid cooling structure of the present invention.

FIG. 1 shows a liquid cooling structure of a first embodiment of the present invention. In the drawing, a PRT 1 is comprised of a panel 11, a funnel 12 and a neck portion 13 which accommodates an electron gun 14.

While an outer surface of the panel 11 is made flat, an inner surface of the panel 11 is bulged toward an electron gun side thus forming a lens. Pads 15 are formed on a funnel portion. The pads 15 are, in general, formed at four positions of the funnel 12. The pads 15 are made of glass and are integrally formed with the funnel 12 at the time of forming the funnel 12 by a press molding. The pads 15 have an important role. That is, the pads 15 support the whole cooling structure in a manner that the pads 15 are brought into contact with a sustainer 2. Surfaces 151 of the pads 15 which are brought into contact with the sustainer 2 are set substantially perpendicular to a tube axis of the PRT 1. In view of the fact that the pads 15 are made of glass, buffers may be inserted between the pads 15 and the sustainer 2 for preventing the formation of flaws on the pads 15.

A liquid coolant 9 is brought into contact with a surface of the panel 11 of the PRT 1 so as to cool the panel surface. The liquid coolant 9 is filled in a chamber formed of the panel 11, a lens 5 and a metal envelope 4 for heat radiation. The liquid coolant 9 which is heated by the panel surface is brought into contact with the metal envelope 4 which is made of material having a good thermal conductivity and heat is radiated from the metal envelope 4. Ethylene glycol or the like can be used as the liquid coolant 9. The sealing between the metal envelope 4 and the panel 11 is obtained by a seal member 7, while the sealing between the metal envelope 4 and the lens 5 is obtained by a seal member 8.

The lens 5 is bulged at a PRT side thereof and is recessed at a side thereof opposite to the PRT side. A hole 41 for filling the liquid coolant 9 in the chamber is formed in the metal envelope 4. An elastic member 10 such as a rubber is used as a seal of the hole 41 to cope with the expansion of the liquid coolant 9 which is brought about by the temperature elevation. The lens 5 is pressed by a holder 6 and the holder 6 is coupled to the sustainer 2 by couplers 3. In FIG. 1, bolts are used as the couplers 3 and the sealing is obtained by fastening the sustainer 2 and the holder 6 to each other with the use of these couplers 3 thus applying pressure to the seal member 7 and the seal member 8 simultaneously. To ensure the strength and the heat radiation efficiency, the holder 6 may be preferably made of metal. The adjustment of fastening pressure by the bolts has an important role to ensure the reliability of the sealing of the liquid coolant 9. In this embodiment, the bolts are used as the couplers 3. In this embodiment, since the operation to apply the mechanical pressure with the use of the bolts is performed simultaneously on the seal member 7 and the seal member 8, the probability of the occurrence of defects on seals by an erroneous operation can be decreased. Further, the operational cost can be reduced.

In this embodiment, an adhesive may be used exclusively as the seal member 7. With respect to the adhesive, a silicone-based adhesive is excellent in view of points that the adhesive exhibits the excellent sealing characteristics and enables the reproduction of various parts. Also in this case, the seal member 7 and the seal member 8 receive the mechanical pressure for sealing. A lens unit 16 is mounted on the holder 6 to magnify an image and to project the magnified image to a screen.

Figure 2:
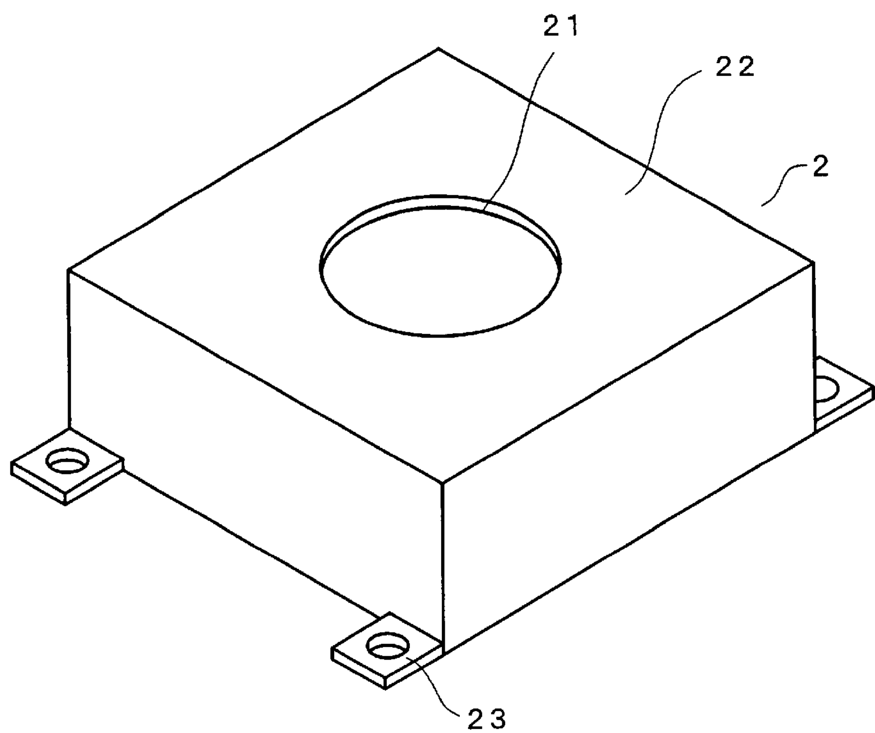
FIG. 2 is perspective view of an example of a sustainer.

Although the sustainer 2 shown in FIG. 1 is formed in a plate shape, the sustainer 2 may be formed in a bottomless box shape as shown in FIG. 2. In FIG. 2, numeral 21 indicates an opening which allows the funnel portion of the PRT 1 to pass therethrough and a surface 22 is brought into contact with the pads 15 formed on the funnel portion. Lugs 23 are provided for being coupled with the holder 6 by means of couplers 3. With the use of the sustainer 2 shown in FIG. 2, the length of the couplers 3 can be shortened.

Figure 3:
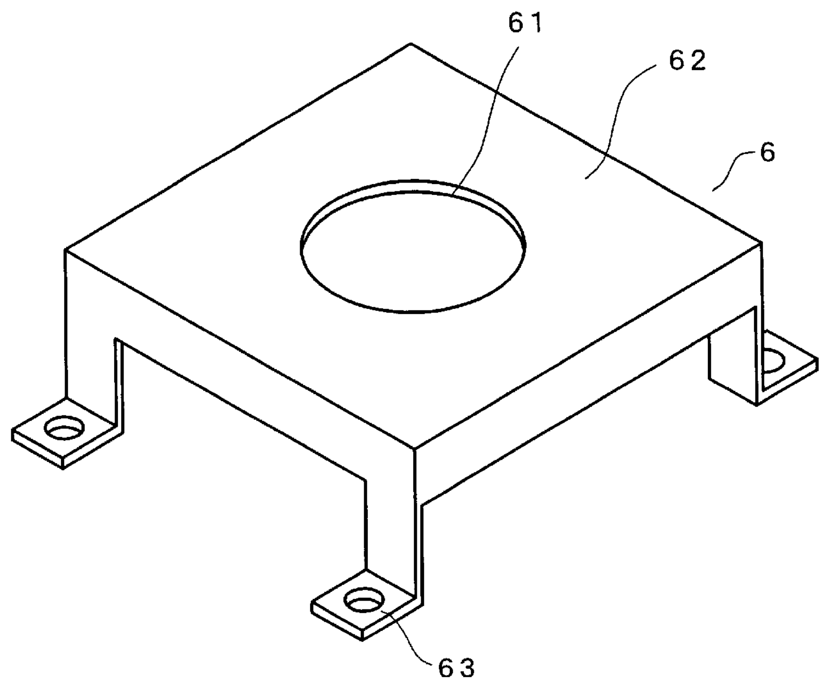
FIG. 3 is a perspective view of an example of a holder.

Further, although the holder 6 shown in FIG. 1 is formed in a plate shape, by forming the holder 6 in a shape shown in FIG. 3, the length of the couplers 3 can be shortened. In FIG. 3, an opening 61 is provided for allowing the image to be projected on the screen to pass therethrough and a flat surface portion 62 brings the periphery of the lens into pressure contact with the metal envelope 4 side. Lugs 63 are coupled to the sustainer 2 by means of the couplers 3. With the use of the holder 6 shown in FIG. 3, the length of the couplers 3 cab be shortened. Further, with the coupled use of the sustainer 2 shown in FIG. 2 and the holder 6 shown in FIG. 3, the length of the couplers 3 can be further shortened.

Figure 4:
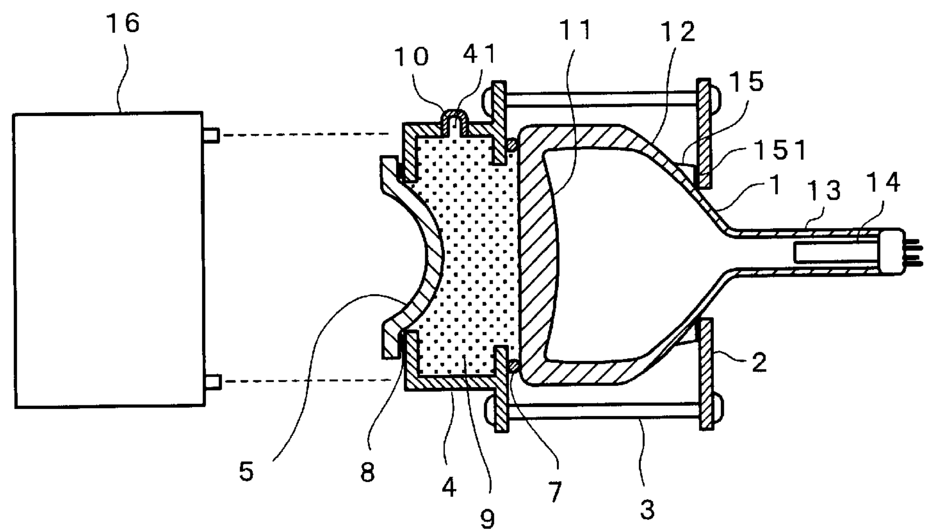
FIG. 4 is a cross-sectional view of a liquid cooling structure of another embodiment of the present invention.

FIG. 4 shows a liquid cooling structure according to another embodiment of the present invention. Parts identical with those shown in FIG. 1 are indicated by same numerals.

In this embodiment, a seal member 8 is made of an adhesive. With respect to the adhesive, a silicone-based adhesive is excellent in view of points that the adhesive exhibits the excellent sealing characteristics and enables the reproduction of various parts. Accordingly, in this embodiment, the holder 6 shown in FIG. 1 is unnecessary. In this embodiment, by fastening a metal envelope 4 and a sustainer 2 by means of couplers 3, the sealing between the metal envelope 4 and a panel 11 is obtained with the use of a seal member 7. Also in this embodiment, bolts are used as the couplers 3. Also in this embodiment, the fastening of bolts for obtaining the sealing is performed by a single operational step. Further, the sealing obtained by the mechanical pressure is performed only one place which corresponds to the seal member 7. Here, a lens unit 16 is mounted on the metal envelope 4.

Figure 5:
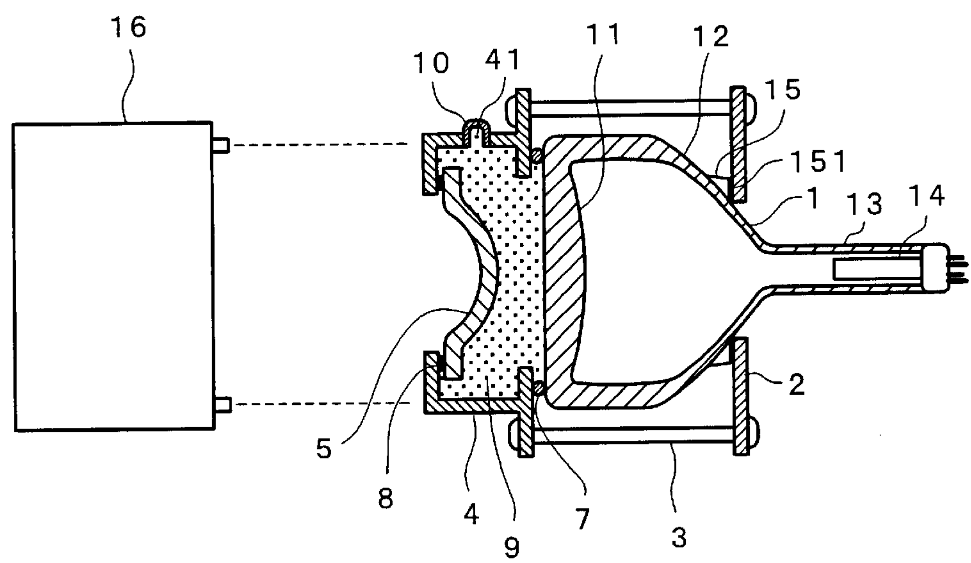
FIG. 5 is a cross-sectional view of a liquid cooling structure of still another embodiment of the present invention.

FIG. 5 shows a liquid cooling structure of another embodiment in which a lens 5 is mounted to the inside of a metal envelope 4 by means of an adhesive 8. In the structure shown in FIG. 4, when a liquid coolant 9 is swelled due to the elevation of temperature, the pressure exerted by the liquid acts in the direction to peel off the lens 5 from the metal envelope 4, in the structure shown in FIG. 5, the pressure exerted by the liquid acts in the direction to bring the lens 5 into pressure contact with the metal envelope 4 and hence, it is advantageous to obtain the reliability of the sealing of the lens 5.

In the embodiments shown in FIG. 4 and FIG. 5, the lens 5 and the metal envelope 4 are preliminarily integrally formed by means of the adhesive and thereafter the metal envelope 4 and the PRT are mechanically coupled to form a chamber for the liquid coolant. In respective embodiments shown in FIG. 4 and FIG. 5, the lens unit 16 is mounted on the metal envelope 4.

Figure 6:
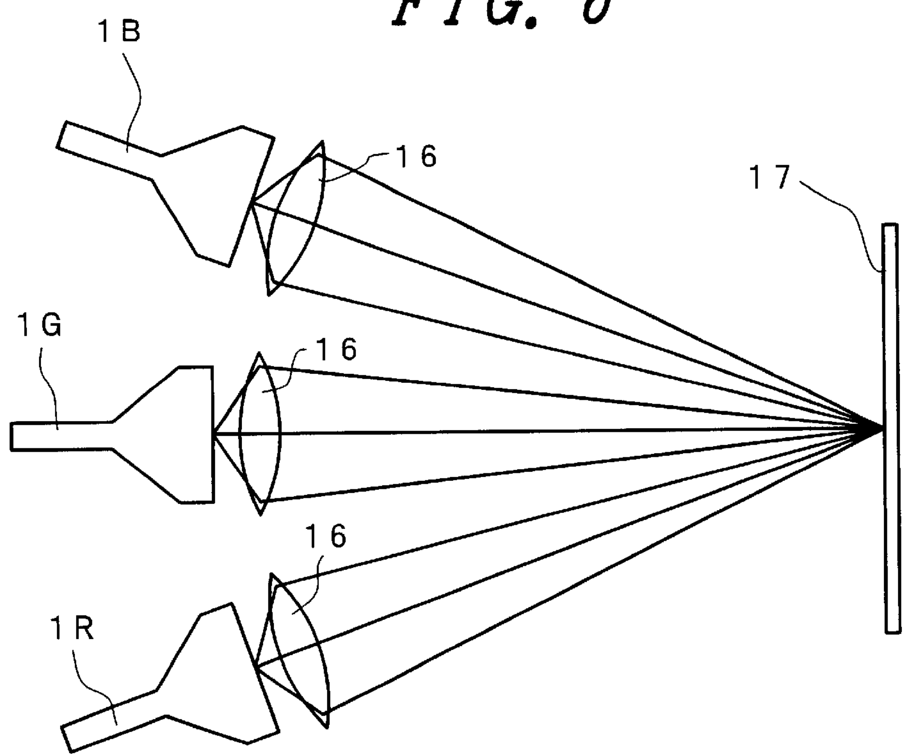
FIG. 6 is a conceptual view of a projection TV set.
Figure 7:
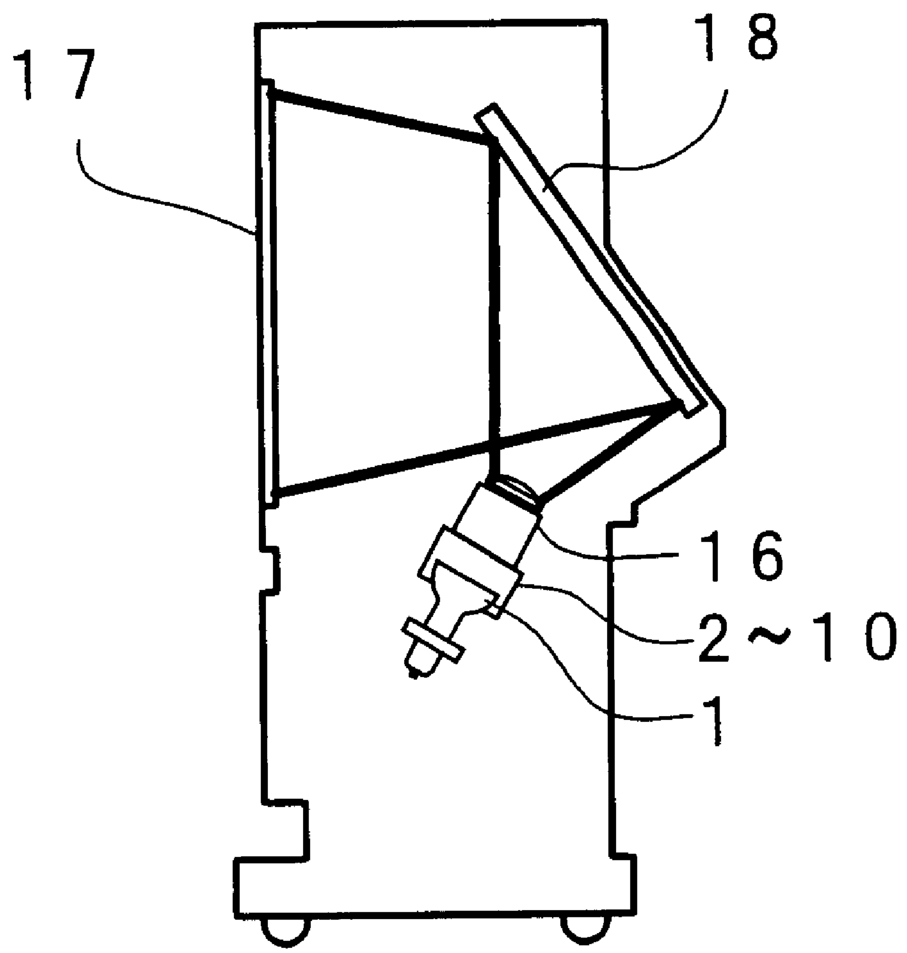
FIG. 7 is a cross-sectional view of an essential part of the projection TV set.

FIG. 6 is a conceptual view of a projection TV set. Images from a PRT 1R which forms a red image, a PRT 1G which forms a green image and a PRT 1B which forms a blue image are projected on a screen 17 after passing through respective lens units 16. The red image, the green image and the blue image are converged on the screen 17. FIG. 7 is a cross-sectional view of an essential portion of the projection TV set. The images from the PRTs 1 pass through the lens units 16 and are reflected on a mirror 18 and are projected on the screen 17.

What is claimed is:

1. A cooling structure of a projection tube characterized in that:

a chamber in which a liquid coolant is filled is formed on the panel surface of the projection tube, a liquid coolant is present in the chamber, the chamber is formed by the panel surface, a lens which faces the panel surface in an opposed manner, and a metal envelope which radiates heat, a first seal member is disposed between the metal envelope and the panel surface, a second seal member is disposed between the metal envelope and the lens, a holder for pressing the lens in the direction toward the metal envelope is disposed in the periphery of the lens, the holder and the sustainer are fastened to each other by means of couplers so as to apply pressure to the first seal member and the second seal member, whereby the chamber is sealed without coupling the couplers with the metal envelope.

2. A cooling structure of a projection tube according to claim 1, wherein a surface of the sustainer which is in contact with the pads is formed in a plate shape.

3. A cooling structure of a projection tube according to claim 1, wherein the sustainer is formed in a bottomless box shape, lugs for coupling the sustainer with the holder are formed on a bottomless side of the sustainer, and the other surface of the sustainer includes an opening which allows the funnel portion to pass therethrough and a surface which is brought into contact with the pads.

4. A cooling structure of a projection tube according to claim 1, wherein lugs which are extended toward the projection tube side to be coupled with the sustainer are integrally formed with the holder.

5. A cooling structure of a projection tube according to claim 1, wherein buffers are disposed between the pads and the sustainer.

6. A cooling structure of a projection tube according to claim 1, wherein the first seal member is an adhesive.

* * * * *